United States Patent
Metcalf

(10) Patent No.: US 9,680,189 B2
(45) Date of Patent: Jun. 13, 2017

(54) SOLAR CELL PHONE

(76) Inventor: Theoda Metcalf, El Paso, TX (US)

( * ) Notice: Subject to any disclaimer, the term of this patent is extended or adjusted under 35 U.S.C. 154(b) by 274 days.

(21) Appl. No.: 13/475,779

(22) Filed: May 18, 2012

(65) Prior Publication Data

US 2013/0040707 A1 Feb. 14, 2013

Related U.S. Application Data

(60) Provisional application No. 61/521,392, filed on Aug. 9, 2011.

(51) Int. Cl.
*H01M 10/46* (2006.01)
*H04M 1/02* (2006.01)

(52) U.S. Cl.
CPC .......... *H01M 10/465* (2013.01); *H04M 1/026* (2013.01)

(58) Field of Classification Search
USPC ........................................................ 320/101
See application file for complete search history.

(56) References Cited

U.S. PATENT DOCUMENTS

| 2002/0088486 A1 | 7/2002 | Chen |
| 2005/0282591 A1 | 12/2005 | Shaff |
| 2006/0238163 A1 | 10/2006 | Chen |
| 2008/0143291 A1 | 6/2008 | Lin et al. |
| 2010/0167797 A1 | 7/2010 | Morichi |
| 2011/0090626 A1* | 4/2011 | Hoellwarth et al. ...... 361/679.01 |
| 2014/0103873 A1* | 4/2014 | Partovi et al. ................ 320/108 |

* cited by examiner

*Primary Examiner* — Thuan Do
(74) *Attorney, Agent, or Firm* — Thien Tran, Esq.; Access Patent Group, LLC

(57) ABSTRACT

A solar cell phone includes a housing having a keypad, a display screen, other electronic components and a rechargeable battery. A diode switch within the housing is electrically connected to the rechargeable battery. A plurality of solar panels are mounted to the housing and electrically connected to the diode switch. The diode switch will allow the solar panels to supply electrical power to the rechargeable battery. An auxiliary battery within the housing receives electrical power from the solar panels. The auxiliary battery will store the electrical power to recharge the rechargeable battery when the diode switch is in a non-operative position, so that the rechargeable battery will continue to operate the keypad, the display screen and the other electronic components within the housing.

6 Claims, 2 Drawing Sheets

SOLAR CELL PHONE

CROSS-REFERENCE TO RELATED APPLICATION

This application claims the benefit of Provisional Patent Application No. 61/521,392, filed on Sep. 8, 2011, in the United States Patent & Trademark Office, the disclosure of which is incorporated herein by reference.

BACKGROUND OF THE INVENTION

1. Field of the Invention

The present invention relates to a cell phone, and more particularly, a solar cell phone.

Cell phones are very convenient, as they allow people to stay connected to friends and loved ones on the go, as well as enable people to conduct business when not in the same room. Certain activities, however, such as conference calls, long business calls, and playing games and videos, can drain the cell phone's battery. In order to recharge the battery, individuals must be near an electrical outlet and must plug the phone into the outlet via a cord for extended lengths of time. If not around an outlet, the phone can die and the person can be stranded. An effective solution is necessary.

The present invention is a solar cell phone with a plurality of small solar panels that can be used to charge the rechargeable battery of the cell phone, rather than using an electrical power source. The present invention can be especially useful for businesspeople who are constantly checking their email or talking to clients, as well as people who use their cell phones to watch TV, watch movies, play games, play music, and surf the Web. Individuals looking to reduce their electric use will appreciate the convenience and practicality afforded by the solar cell phone.

2. Description of the Prior Art

Numerous innovations for solar powered cell phones have been provided in the prior art that will be described. Even though these innovations may be suitable for the specific individual purposes to which they address, however, they differ from the present invention.

A FIRST EXAMPLE, U.S. Patent Office Publication No. 2002/0088486, Published on Jul. 11, 2002, to Chenx teaches a solar-powered device that is adapted to be disposed on a battery unit of a mobile telephone handset so as to charge the battery unit. The solar-powered device includes a light sensor, a photoelectric converting circuit coupled operably to the light sensor so as to convert light that is sensed by the light sensor into a corresponding current signal, and a current processing circuit, coupled electrically to the photoelectric converting circuit, for receiving and processing the current signal so as to result in a charging current that is adapted to charge the battery unit of the mobile telephone handset.

A SECOND EXAMPLE, U.S. Patent Office Publication No. 2005/0282591, Published on Dec. 22, 2005, to Shaff teaches a mobile telephone apparatus in which a solar power source is used to supplement battery power. A solar cell array is positioned on the surface of the telephone and supplies electric current to the telephone. A preferred embodiment of the present invention is equipped with speech recognition software that allows the user to issue commands (such as dialing the telephone) verbally to the telephone. In addition, this speech recognition may be used to operate an integrated AM/FM broadcast radio to allow the telephone to double as a radio. In an alternative embodiment, the solar mobile telephone is integrated into a headset to allow for convenient hands-free operation.

A THIRD EXAMPLE, U.S. Patent Office Publication No.2006/0238163, Published on Oct. 26, 2006, to Chen teaches a mobile phone which includes a main body. The main body further includes a solar power module, a display module, and an input module (i.e., a keypad). The solar power module is adapted for providing electrical power to the mobile phone. The solar power module includes a solar cell panel configured for converting light energy to electrical power. The input module includes a control switch for setting the solar power module in one of the following states: "on", "off", or "storage". Advantageously, the mobile phone can also be supplied with at least one heating pad disposed on the surface thereof, selectively controlled (e.g., on/off and/or a temperature chosen), to provide heat to a hand and/or other body part of a user.

A FOURTH EXAMPLE, U.S. Patent Office Publication No. 2008/0143291, Published on Jun. 19, 2008, to Lin et al. teaches a communication apparatus with a solar energy charging function that includes a host and a display panel movably and pivotally coupled to the host to define a foldable mobile phone, and a solar panel is coaxially and pivotally coupled to a shaft of the host, such that the solar panel can be folded and covered onto an upper surface of the display panel. If the battery power of the mobile phone is low, users can individually lift the solar panel open from the display panel to charge the battery that is electrically coupled to the mobile phone, so as to enhance the power capacity, using time limit and battery charging requirements of the communication apparatus.

A FIFTH EXAMPLE, U.S. Patent Office Publication No.2010/0167797, Published on Jul. 1, 2010, to Morichi teaches a cellular phone according to the present invention comprises a plurality of solar cell modules arranged on different surfaces of a casing, a plurality of electric power control parts connected to each of the plurality of solar cell modules, a mechanical form detection sensor as a state detection part for detecting a state of said cellular phone, and an electric power selection part.

It is apparent now that numerous innovations for solar powered cell phones have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a solar cell phone that avoids the disadvantages of the prior art.

ANOTHER OBJECT of the present invention is to provide a solar cell phone that is simple and inexpensive to manufacture.

STILL ANOTHER OBJECT of the present invention is to provide a solar cell phone that is simple to use.

BRIEFLY STATED, STILL YET ANOTHER OBJECT of the present invention is to provide a solar cell phone which comprises a housing having a keypad, a display screen, other electronic components and a rechargeable battery. A diode switch within the housing is electrically connected to the rechargeable battery. A plurality of solar panels are mounted to the housing and electrically connected to the diode switch. The diode switch will allow the solar panels to supply electrical power to the rechargeable battery. An auxiliary battery within the housing receives electrical power from the solar panels. The auxiliary battery will store the electrical power to recharge the rechargeable battery when the diode switch is in a non-operative position, so that the rechargeable battery will continue to operate the keypad, the display screen and the other electronic The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWINGS

The figures of the drawings are briefly described as follows.

Figure 1:
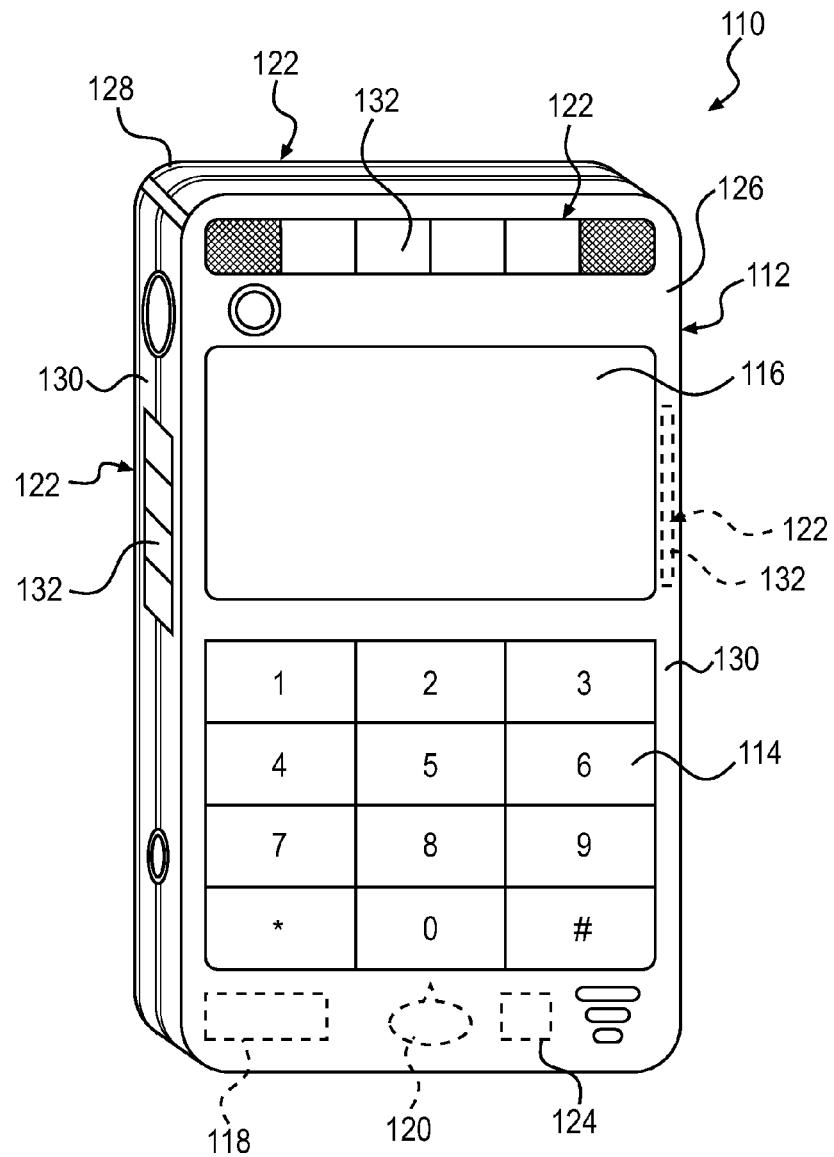
FIG. 1 is a perspective view of the present invention.

REFERENCE NUMERALS UTILIZED IN THE DRAWING 110 solar cell phone
112 housing of solar cell phone 110
114 keypad in housing 112
116 display screen in housing 112
118 rechargeable battery in housing 112
120 diode switch in housing 112
122 solar panel of solar cell phone 110
124 auxiliary battery of solar cell phone 110
126 front of housing 112
128 back of housing 112
130 side of housing 112
132 thin solar cell in solar panel 122
134 lead in solar panel 122

DETAILED DESCRIPTION OF THE PREFERRED EMBODIMENT

Figure 3:
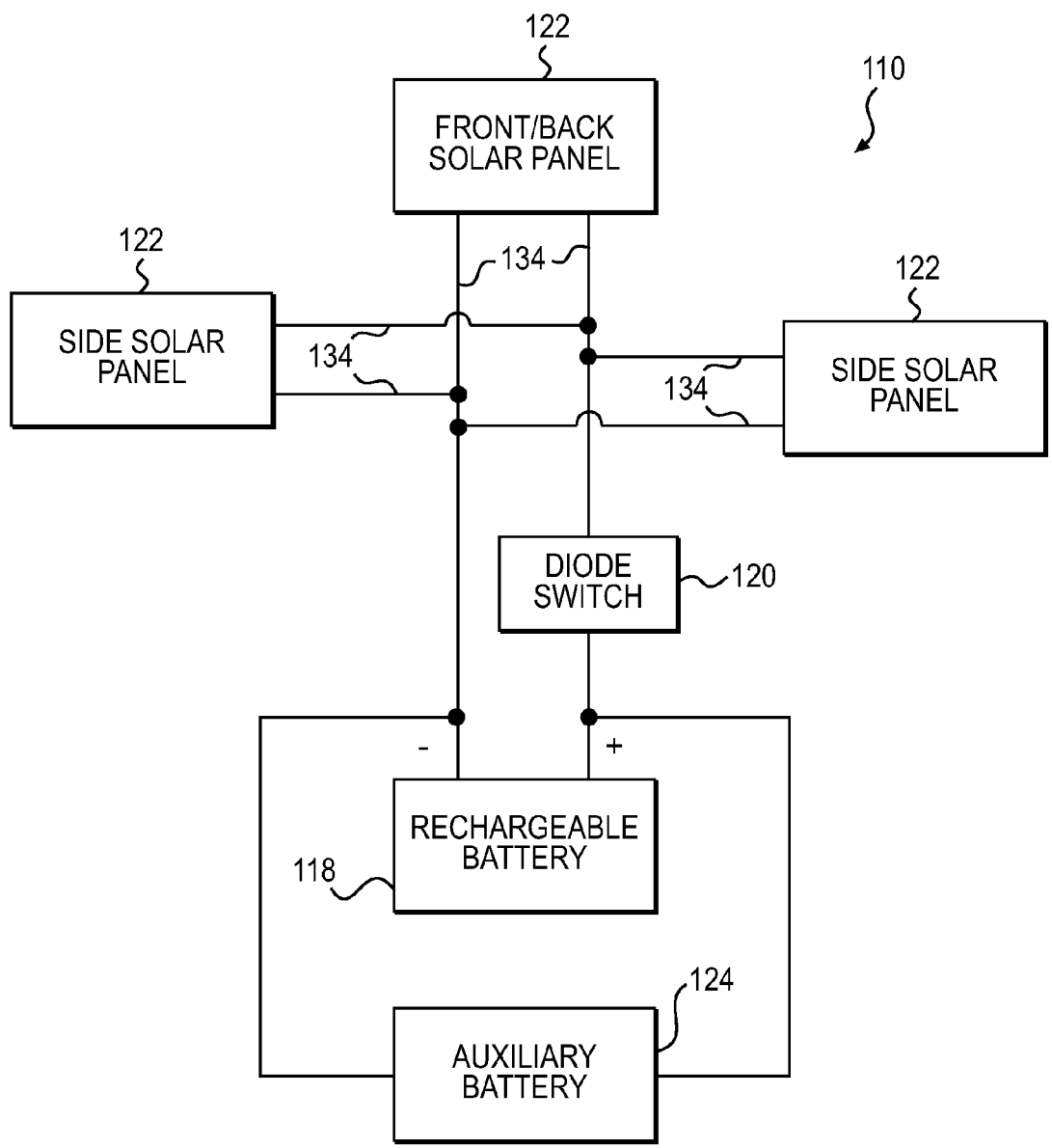
FIG. 3 is a block diagram of the electrical circuit of the present invention.

As shown in FIGS. 1 and 3 the present invention is a solar cell phone 110 which comprises a housing 112 having a keypad 114, a display screen 116, other electronic components and a rechargeable battery 118. A diode switch 120 within the housing 112 is electrically connected to the rechargeable battery 118. A plurality of solar panels 122 are mounted to the housing 112 and electrically connected to the diode switch 120.

Figure 2:
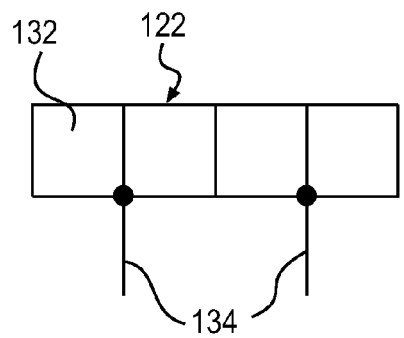
FIG. 2 is a plan view of on solar panel in greater detail.

As shown in FIG. 2: each solar panel 122 comprises a series of thin solar cells 132 and a pair of leads 134, whereby one lead 134 is a negative conductor, while the other lead 134 is a positive conductor. Each lead 134 of the solar panel 122 can be comprised of a three watt size. Each lead 134 of the solar panel 112 can also be comprised of a four (04) watt size.

The rechargeable battery 118 of the solar cell phone 110 is comprised of a 3.7-3.8 volt size. The auxiliary battery 124 of the solar cell phone 110 is comprised of a 3.7-3.8 volt size.

As shown in FIG. 3: the diode switch 120 will allow the solar panels 122 to supply electrical power to the rechargeable battery 118. An auxiliary battery 124 within the housing 112 receives electrical power from the solar panels 122. The auxiliary battery 124 will store the electrical power to recharge the rechargeable battery 118 when the diode switch 120 is in a non-operative position. The rechargeable battery 118 will continue to operate the keypad 114, the display screen 116 and the other electronic components within the housing 112. The solar panels 122 are mounted to the front 126, back 128 and sides 130 of the housing 112. The rechargeable battery 118 and battery 124 have about 3.7-3.8 volt size.

The present invention allows an individual to charge the solar cell phone 110 with a plurality solar panels 122, thereby eliminating the current dependency on electricity. The solar cell phone 110 can be developed by using the same technology as solar-powered calculators. The solar cell phone 110 can be produced in many different styles and designs and through various providers. The exact specifications, materials used, and method of use of the solar cell phone 110 may vary upon manufacturing.

It will be understood that each of the elements described above, or two or more together, may also find a useful application in other types of constructions differing from the types described above.

While the invention has been illustrated and described as embodiments of a solar cell phone, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A solar cell phone which comprises:
    a) a housing having a keypad, a display screen, other electronic components and a rechargeable battery;
    b) a diode switch within the housing electrically connected to the rechargeable battery;
    c) a plurality of solar panels mounted to the housing and electrically connected to the diode switch, whereby the diode switch will allow the solar panels to supply electrical power to the rechargeable battery, wherein each solar panel comprises:
    a series of thin solar cells; and
    a pair of leads, whereby one lead is a negative conductor, while the other lead is a positive conductor; and
    d) an auxiliary battery, which is connected in parallel with the rechargeable battery, within the housing, receives electrical power from the solar panels, whereby the auxiliary battery will store the electrical power to recharge the rechargeable battery when the diode switch is in a non-operative position, so that the rechargeable battery will continue to operate the keypad, the display screen and the other electronic components within the housing.

2. The solar cell phone as recited in claim 1, wherein the solar panels are mounted to the front, back, and sides of the housing.

3. The solar cell phone as recited in claim 1, wherein each lead of the solar panel is comprised of a three watt size.

4. The solar cell phone as recited in claim 1, wherein each lead of the solar panel is comprised of a four watt size.

5. The solar cell phone as recited in claim 1, wherein the rechargeable battery is comprised of a 3.7-3.8 volt size.

6. The solar cell phone as recited in claim 1, wherein the auxiliary battery is comprised of a 3.7-3.8 volt size.

\* \* \* \* \*